(No Model.)

L. H. STODDER.
PNEUMATIC TIRE FOR BICYCLES.

No. 584,066. Patented June 8, 1897.

Witnesses
R. J. Jacker.
Theo. B. Heller.

Lee H. Stodder
Inventor

By his Attorney
Frank D. Thomason

UNITED STATES PATENT OFFICE.

LEE H. STODDER, OF CHICAGO, ILLINOIS.

PNEUMATIC TIRE FOR BICYCLES.

SPECIFICATION forming part of Letters Patent No. 584,066, dated June 8, 1897.

Application filed December 31, 1894. Serial No. 533,460. (No model.)

*To all whom it may concern:*

Be it known that I, LEE H. STODDER, a citizen of the United States, and a resident of Chicago, in the county of Cook and State of Illinois, have invented certain new and useful Improvements in Pneumatic Tires for Vehicles, of which the following is a specification.

My invention relates to an improvement in pneumatic tires, with the object in view of rendering them puncture-proof; and my invention consists in a pneumatic tire composed of several layers of material, one of said layers being a flexible fabric treated with a mixture of alcohol, resin, and borax.

Figure 1:
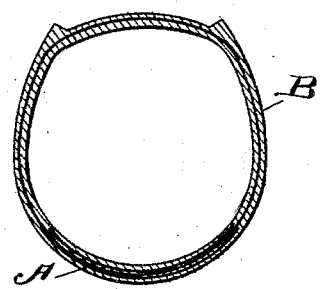
Figure 2:
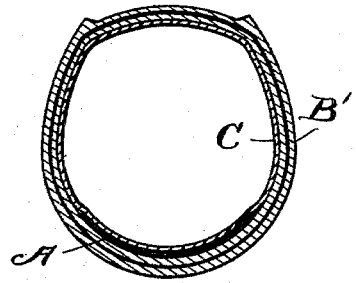

In the accompanying drawings, Figure 1 is a cross-section of a tire, showing the manner of using my improved puncture-proof material; and Fig. 2 is a similar view showing a slightly-different method of using said material.

A represents a treated woven fabric forming one layer of the tire. Its body may consist of what is known in the art as "duck-cloth," "cotton-cloth," or other closely-woven fabric, and it is rendered puncture-proof while still retaining its pliable nature by treating it with some suitable resinous gum—such, for example, as that commonly called "resin"—dissolved in alcohol and mixed with borax. The treatment is carried out as follows:

I dissolve the resin in alcohol, using equal proportions of each—for example, forty-five per cent. of alcohol and forty-five per cent. of resin—and add thereto about two per cent. of powdered borax and about eight per cent. of turpentine. Turpentine itself being of a resinous nature may be dispensed with, although I prefer to use it.

The fabric is submerged in the mixture of gum, alcohol, and borax and allowed to soak until thoroughly impregnated with the solution and then removed and thoroughly dried.

The effect of the borax is to render the treated fabric flexible and pliable without danger of causing the material to flake or crack.

The treated fabric A presents such an obstacle to pointed articles—such, for example, as pins, tacks, and sharp corners of glass, shells, and pottery—as to turn their points or recede under pressure without becoming punctured or to any considerable extent injured.

After the puncture-proof layer A has become thoroughly dried I face it upon one or both sides with a layer or layers of rubber and vulcanize the whole together. As shown in Fig. 1, there is an outer layer B and an inner layer C of rubber.

The puncture-proof material may be used in a single layer or several such layers may be introduced.

I prefer in practice to place several layers of the puncture-proof material opposite the tread of the tire, so as to increase its resistance to sharp-pointed articles, because it is at this point that the tire is more apt to be punctured.

In Fig. 2 I have shown the puncture-proof material located at the inside of the outer layer, omitting the layer of rubber upon the inside of the layer of the puncture-proof material.

Instead of vulcanizing layers of rubber to the one or both of the surfaces of the layer of puncture-proof material, I may locate the puncture-proof material loosely between tubes of rubber, but I prefer uniting them by vulcanization.

What I claim is—

A pneumatic tire comprising one or more layers of fabric treated with a mixture of alcohol, resin and borax and one or more layers of rubber, substantially as set forth.

LEE H. STODDER.

Witnesses:
THEO. B. HELLER,
FRANK D. THOMASON.